(12) United States Patent
Feng

(10) Patent No.: US 9,907,036 B2
(45) Date of Patent: Feb. 27, 2018

(54) MULTIPATH TIME DIVISION SERVICE TRANSMISSION METHOD AND DEVICE

(71) Applicant: Sanechips Technology Co.,Ltd., Shenzhen (CN)

(72) Inventor: Gang Feng, Shenzhen (CN)

(73) Assignee: Sanechips Technology Co., Ltd., Shenzhen, Guangdong (CN)

(*) Notice: Subject to any disclaimer, the term of this patent is extended or adjusted under 35 U.S.C. 154(b) by 18 days.

(21) Appl. No.: 15/035,464

(22) PCT Filed: May 19, 2014

(86) PCT No.: PCT/CN2014/077831
§ 371 (c)(1),
(2) Date: May 9, 2016

(87) PCT Pub. No.: WO2014/183683
PCT Pub. Date: Nov. 20, 2014

(65) Prior Publication Data
US 2016/0295531 A1    Oct. 6, 2016

(30) Foreign Application Priority Data

Nov. 11, 2013  (CN) .......................... 2013 1 0558155

(51) Int. Cl.
*H04W 56/00* (2009.01)
*H04L 1/00* (2006.01)
(Continued)

(52) U.S. Cl.
CPC ........... *H04W 56/00* (2013.01); *H04L 1/0079* (2013.01); *H04L 47/34* (2013.01); *H04L 47/625* (2013.01); *H04W 72/0446* (2013.01)

(58) Field of Classification Search
CPC ....... H04L 47/34; H04L 1/0079; H04W 56/00
See application file for complete search history.

(56) References Cited

U.S. PATENT DOCUMENTS

2003/0227943 A1* 12/2003 Hallman ................. H04L 12/56
                                                          370/503
2004/0047367 A1*  3/2004 Mammen .............. H04J 3/0623
                                                          370/472
(Continued)

FOREIGN PATENT DOCUMENTS

CN      1193433 A       9/1998
CN      1538679 A      10/2004
(Continued)

OTHER PUBLICATIONS

International Search Report in international application No. PCT/CN2014/077831, dated Sep. 9, 2014.
(Continued)

*Primary Examiner* — Wei Zhao
(74) *Attorney, Agent, or Firm* — Oppedahl Patent Law Firm LLC

(57) ABSTRACT

Disclosed is a multipath time division service transmission method, comprising: calculating a channel service serial number corresponding to the time division service of each path, determining, according to the calculated channel service serial number, the channel number (CN) of a channel having service data transmission, and respectively and sequentially writing the service data and CN of the channel having service data transmission into a service data first input first output (FIFO) and a service channel index (CI) FIFO; and correspondingly, in order to read a service, respectively reading from the service data FIFO and the service CI FIFO the service data of the time division service and the CN of the channel transmitting the same. Also disclosed is a transmission device of a multipath time division service.

4 Claims, 5 Drawing Sheets

(51) Int. Cl.
*H04L 12/801* (2013.01)
*H04L 12/863* (2013.01)
*H04W 72/04* (2009.01)

(56) References Cited

U.S. PATENT DOCUMENTS

| | | |
|---|---|---|
| 2004/0108860 A1 | 6/2004 | Spanke |
| 2007/0268868 A1* | 11/2007 | Singh ............... H04L 12/1863 370/331 |
| 2008/0268778 A1 | 10/2008 | De La Garrigue |
| 2010/0069030 A1 | 3/2010 | Briand |

FOREIGN PATENT DOCUMENTS

| | | |
|---|---|---|
| CN | 101105786 A | 1/2008 |
| CN | 101105876 A | 1/2008 |
| CN | 101720037 A | 6/2010 |
| CN | 101860408 A | 10/2010 |
| CN | 102025438 A | 4/2011 |
| CN | 102129443 A | 7/2011 |
| WO | 9624995 A2 | 8/1996 |

OTHER PUBLICATIONS

English Translation of the Written Opinion of the International Search Authority in international application No. PCT/CN2014/077831, dated Sep. 5, 2014.
Supplementary European Search Report in European application No. 14797870.4, dated Dec. 13, 2016.

* cited by examiner

MULTIPATH TIME DIVISION SERVICE TRANSMISSION METHOD AND DEVICE

TECHNICAL FIELD

The present disclosure relates to data transmission, and in particular to a method and device for transmitting multiple streams of Time Division (TD) traffic.

BACKGROUND

A data transmission rate of a wireless communication system is limited by a radio spectrum. To save a data transmission bandwidth, when the wireless communication system transmits multiple streams of Time Division traffic, a bitmap is used for indicating a number of streams of Time Division traffic data transmitted on a time slot under consideration, and a bit width of the bitmap is used for representing a maximal number of transmitted streams of Time Division traffic data supported by the system. When the wireless communication system supports eight streams of E1 traffic, a bitmap thereof will be 8-bit wide. The eight streams of E1 traffic data may be transmitted in a frame format as shown in FIG. 1, where a time slot under consideration may include five streams of E1 data packets, i.e., a first, a third, a fourth, a fifth, and an eighth stream of E1. Then, the bitmap may be 10111001, meaning that subsequently a first E1 fragment is the first stream, a second E1 fragment is the third stream, a third E1 fragment is the fourth stream, a fourth E1 fragment is the fifth stream, and a fifth E1 fragment is the eighth stream. A E1 fragment numbering thereof is a Channel Number (CN) of the E1 data. The CNs and the E1 data are to be transmitted simultaneously to the wireless communication system.

In related art, a bitmap is used for representing a frame structure of Time Division traffic. For example, a structure for receiving eight streams of E1 data is as shown in FIG. 2. According to the bitmap, a stream of E1 data may be placed into a First Input First Output queue (FIFO) with a FIFO number corresponding to the number of the stream of E1 data. For example, the first stream of E1 data may be placed into a location indexed by FIFO Number 1, the third stream of E1 data may be placed into a location indexed by FIFO Number 3, and so on. Then, during data reading, a stream of E1 data may be read from a FIFO with a corresponding FIFO Number. However, such a frame format may be disadvantageous for reasons as follows.

Firstly, FIFO pointer control during data writing and reading is complicated. When the number of routes of Time Division traffic supported by the system is increased up to tens or even hundreds or thousands, it is difficult to ensure, by writing pointer control, real-time writing of input data into the FIFO; and reading pointer is complicated, as well, thereby not only leading to low circuit reliability, but also consuming massive circuit resources, in which case it is difficult to implement sequential transmission of Time Division traffic data.

Secondly, a number of streams of Time Division traffic borne on a frame may differ depending on each frame. In an extreme case, this may result in a situation where Time Division traffic data on a later frame are output to the FIFO before Time Division traffic data on an earlier frame, leading to an excessively large jitter of the Time Division traffic data, failing to meet a requirement of the communication system.

SUMMARY

In view of this, embodiments herein provide a method and device for transmitting multiple streams of Time Division traffic.

A technical solution according to an embodiment herein may be implemented as follows.

According to an embodiment herein, a method for transmitting multiple streams of Time Division traffic includes:

calculating a channel traffic sequence number corresponding to a stream of Time Division traffic; determining, according to the calculated channel traffic sequence number, a Channel Number (CN) of a channel bearing traffic data; successively writing the traffic data borne on the channel bearing the traffic data and the CN of the channel bearing the traffic data respectively into a traffic data First Input First output queue (FIFO) and a traffic Channel Index (CI) FIFO.

According to an embodiment herein, a device for transmitting multiple streams of Time Division traffic includes a calculator, a first reader-writer, an encoder, a second reader-writer, a traffic data First Input First output queue (FIFO), and a traffic Channel Index (CI) FIFO.

The calculator is configured for: calculating a channel traffic sequence number corresponding to a stream of Time Division traffic.

The first reader-writer is configured for: writing traffic data borne on a channel bearing the traffic data successively into the traffic data FIFO.

The encoder is configured for: determining, according to the channel traffic sequence number calculated by the calculator, a Channel Number (CN) of the channel bearing the traffic data.

The second reader-writer is configured for: writing the CN of the channel bearing the traffic data successively into the traffic CI FIFO.

The traffic data FIFO is configured for: storing the traffic data borne on the channel bearing the traffic data.

The traffic CI FIFO is configured for: storing the CN of the channel bearing the traffic data.

With the method and device for transmitting multiple streams of TD traffic according to embodiments herein, a channel traffic sequence number corresponding to a stream of Time Division traffic is calculated; a Channel Number (CN) of a channel bearing traffic data is determined according to the calculated channel traffic sequence number; the traffic data borne on the channel bearing the traffic data and the CN of the channel bearing the traffic data are successively written respectively into a traffic data First Input First output queue (FIFO) and a traffic Channel Index (CI) FIFO. When traffic needs to be read, traffic data of the Time Division traffic and a CN of a channel bearing the traffic data of the Time Division traffic may be read respectively from the traffic data FIFO and the traffic CI FIFO. In this way, synchronization transmission of CNs of multiple streams of Time Division traffic and of traffic data of the multiple streams of Time Division traffic may be ensured during transmission of the multiple streams of Time Division traffic, while reducing massive logic overheads brought by Time Division traffic data synchronization during Time Division traffic data transmission, increasing stability in Time Division traffic data transmission.

DETAILED DESCRIPTION

According to embodiments herein, a channel traffic sequence number corresponding to a stream of Time Division traffic is calculated; a Channel Number (CN) of a channel bearing traffic data is determined according to the calculated channel traffic sequence number; the traffic data borne on the channel bearing the traffic data and the CN of the channel bearing the traffic data are successively written respectively into a traffic data First Input First output queue (FIFO) and a traffic Channel Index (CI) FIFO.

The traffic data borne on the channel bearing the traffic data may be written successively into the traffic data FIFO according to a transmission order. The CN of the channel bearing the traffic data may be written successively into the traffic CI FIFO according to the channel traffic sequence number.

When traffic needs to be read, traffic data of the Time Division traffic and a CN of a channel bearing the traffic data of the Time Division traffic may be read respectively from the traffic data FIFO and the traffic CI FIFO.

A channel traffic sequence number corresponding to a stream of Time Division traffic may be calculated according to a bitmap of multiple streams of Time Division traffic. A CI may represent a channel traffic sequence corresponding to a stream of Time Division traffic.

A CN of a channel bearing traffic data may be determined according to the calculated channel traffic sequence number and a Current write number (CWN) of an encoder. Given a CWN, the CN corresponding to the channel bearing the traffic data may be obtained according to the calculated channel traffic sequence number corresponding to the channel bearing the traffic data. Obtained CN values may then be stored successively into the traffic CI FIFO according to channel traffic sequence numbers.

Figure 3:
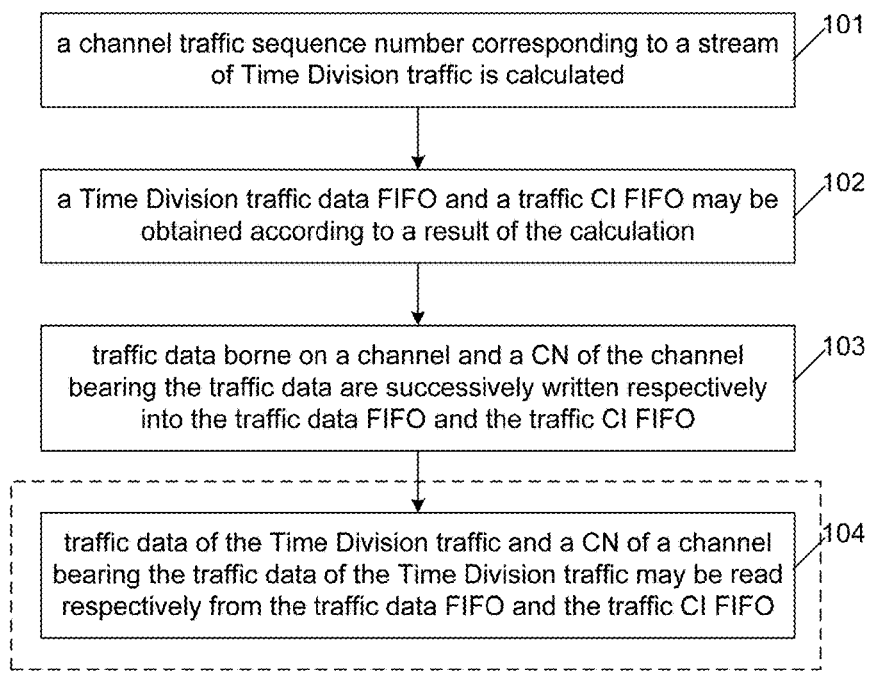
FIG. 3 is a flowchart of a method for transmitting multiple streams of Time Division traffic according to an embodiment herein.

As shown in FIG. 3, a flow of a method for transmitting multiple streams of Time Division traffic according to an embodiment herein includes steps as follows.

In step 101, a channel traffic sequence number corresponding to a stream of Time Division traffic is calculated.

A channel traffic sequence number corresponding to a stream of Time Division traffic may be calculated according to a bitmap of multiple streams of Time Division traffic.

A channel traffic sequence number corresponding to a stream of Time Division traffic may be obtained by obtaining a sum over a bit corresponding to the stream of Time Division traffic and any preceding bit in the bitmap, and then ANDing the sum with the bit corresponding to the stream of Time Division traffic.

In step 102, a CN of a channel bearing traffic data is determined according to the calculated channel traffic sequence number.

Any channel traffic sequence number equal to zero may be filtered out from channel traffic sequence numbers corresponding respectively to streams of Time Division traffic calculated in step 101. A channel corresponding to a nonzero channel traffic sequence number may be determined to be a channel bearing traffic data. The CN of the channel bearing the traffic data may thus be determined.

In the step, the sequence number of Time Division traffic data being transmitted may be calculated by MODing the CI of the Time Division traffic data being transmitted with the CWN. The CWN may be increased by 1 after transmission of a stream of Time Division traffic data. Given the CWN value, the CN corresponding to the channel bearing the traffic data may be obtained according to the channel traffic sequence number calculated in step 101.

In step 103, traffic data borne on a channel and a CN of the channel bearing the traffic data are successively written respectively into the traffic data FIFO and the traffic CI FIFO.

The traffic data borne on the channel bearing the traffic data may be written successively into the traffic data FIFO according to a transmission order. The CN of the channel bearing the traffic data may be written successively into the traffic CI FIFO according to the channel traffic sequence number.

The method may further include step 104, where when traffic needs to be read, traffic data of the Time Division traffic and a CN of a channel bearing the traffic data of the Time Division traffic may be read respectively from the traffic data FIFO and the traffic CI FIFO. Reading from FIFO is known art and therefore is not repeated herein.

Figure 1:
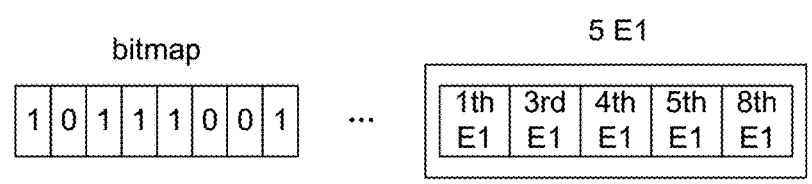
FIG. 1 is a diagram of a frame format for transmitting eight streams of E1 traffic according to related art.
Figure 2:
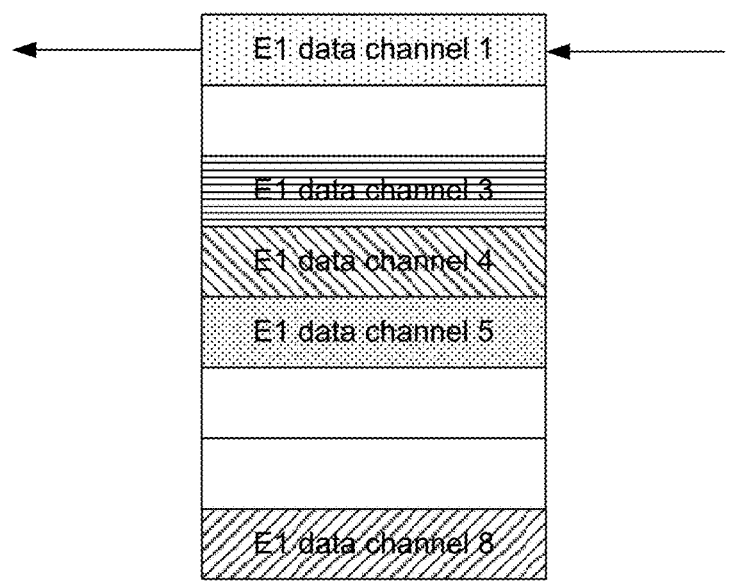
FIG. 2 is a diagram of a structure for receiving eight streams of E1 traffic data according to related art.
Figure 4:
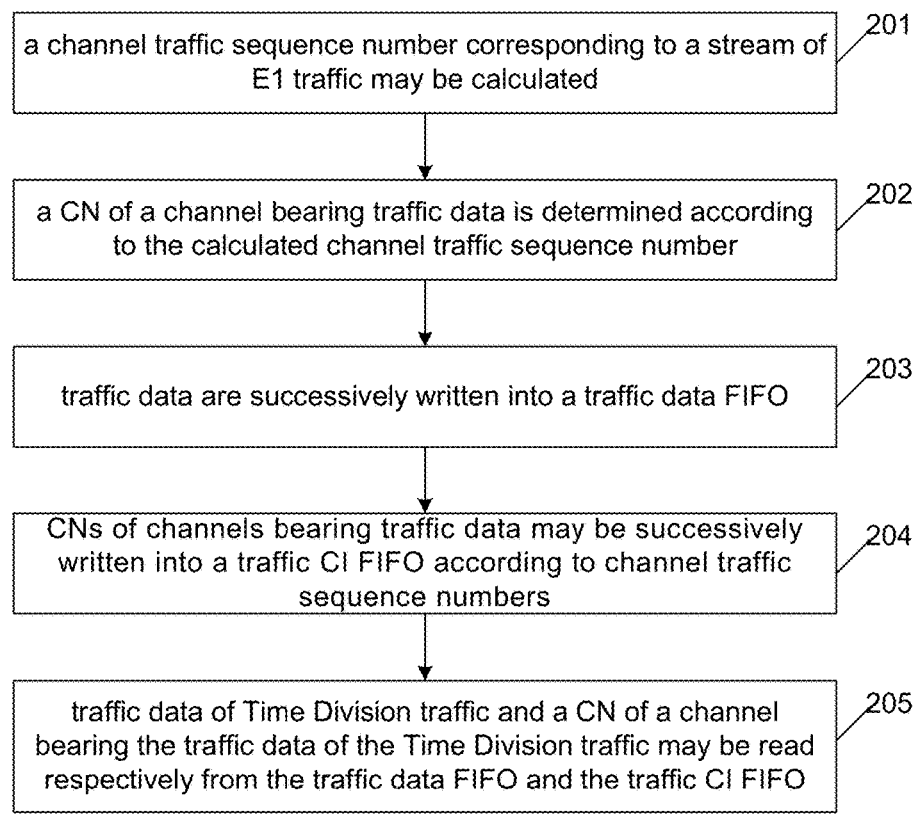
FIG. 4 is a flowchart of a method for transmitting eight streams of E1 traffic according to an embodiment herein.

Consider transmission of eight streams of E1 traffic, for example. According to the embodiment, eight streams of E1 traffic data may be transmitted using a frame format as shown in FIG. 1, a time slot under consideration may include five streams of E1 traffic data packets to be transmitted, i.e., a first, a third, a fourth, a fifth, and an eighth stream of E1. Such transmission corresponds to a Time Division traffic bitmap 10111001. As shown in FIG. 4, a flow of a method for transmitting eight streams of E1 traffic according to the embodiment may include steps as follows.

In step 201, a channel traffic sequence number corresponding to a stream of E1 traffic may be calculated.

A channel traffic sequence number corresponding to a stream of Time Division traffic may be calculated according to the bitmap as shown in FIG. 1.

A channel traffic sequence number corresponding to a stream of Time Division traffic may be obtained by obtaining a sum over a bit corresponding to the stream of Time Division traffic and any preceding bit in the bitmap, and then ANDing the sum with the bit corresponding to the stream of Time Division traffic.

Figure 5:
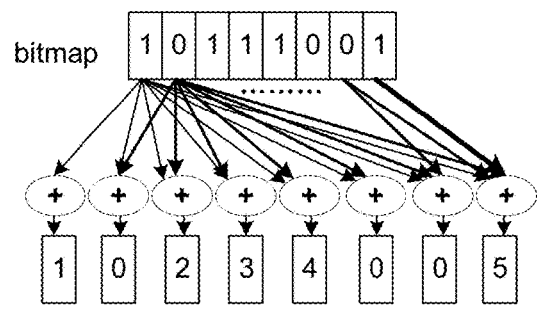
FIG. 5 is a diagram of a structure for calculating a FIFO of eight streams of E1 traffic data according to an embodiment herein.

According to the embodiment, with the bitmap[1:8] =8'b10111001, the sum operation for calculating channel traffic sequence numbers corresponding respectively to eight streams of E1 has a calculating structure as shown in FIG. 5. FIG. 5 may include eight adders, each corresponding to a stream of traffic. To calculate the channel traffic sequence number of the first stream of traffic, the first bit may be input to the first adder. To calculate the channel traffic sequence number of the second stream of traffic, the first and the second bits may be input to the second adder. To calculate the channel traffic sequence number of the third stream of traffic, the first, the second, and the third bits may be input to the third adder, and so on. To calculate the channel traffic sequence number of the eighth stream of traffic, the first to the eighth bits may all be input to the eighth adder. A formula thereof may be as follows.

CI1=bitmap[1]&bitmap[1]=1.

That is, the first stream of Time Division traffic data may correspond to the first channel traffic sequence number.

CI2=(bitmap[1]+bitmap[2])&bitmap[2]=0.

CI3=(bitmap[1]+bitmap[2]+bitmap[3])&bitmap[3]=2.

That is, the third stream of Time Division traffic data may correspond to the second channel traffic sequence number.

CI4=(bitmap[1]+bitmap[2]+bitmap[3]+bitmap[4])
&bitmap[4]=3.

That is, the fourth stream of Time Division traffic data may correspond to the third channel traffic sequence number.

CI5=(bitmap[1]+bitmap[2]+bitmap[3]+bitmap[4]+
bitmap[5])&bitmap[5]=4.

That is, the fifth stream of Time Division traffic data may correspond to the fourth channel traffic sequence number.

CI6=(bitmap[1]+bitmap[2]+bitmap[3]+bitmap[4]+
bitmap[5]+bitmap[6]) &bitmap[6]=0.

CI7=(bitmap[1]+bitmap[2]+bitmap[3]+bitmap[4]+
bitmap[5]+bitmap[6]+bitmap[7])&bitmap[7]=0.

CI8=(bitmap[1]+bitmap[2]+bitmap[3]+bitmap[4]+
bitmap[5]+bitmap[6]+bitmap[7]+bitmap[8])
&bitmap[8]=5.

That is, the eighth stream of Time Division traffic data may correspond to the fifth channel traffic sequence number.

In step 202, a CN of a channel bearing traffic data is determined according to the calculated channel traffic sequence number.

Any channel traffic sequence number equal to zero may be filtered out from channel traffic sequence numbers corresponding respectively to streams of Time Division traffic calculated in step 201. According to the embodiment, channels bearing the traffic data may respectively be the first, the third, the fourth, the fifth, and the eighth channels, corresponding respectively to CN1, CN3, CN4, CN5, and CN8.

In step 203, traffic data are successively written into a traffic data FIFO.

Figure 6:
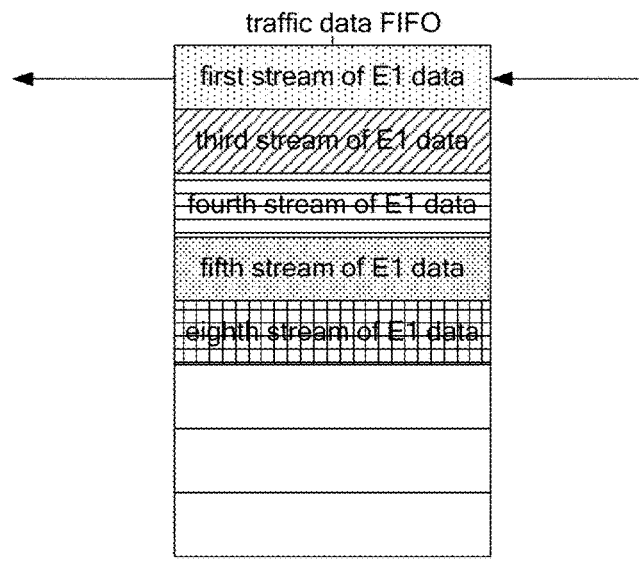
FIG. 6 is a diagram of a CI FIFO of eight streams of E1 traffic according to an embodiment herein.

The first, the third, the fourth, the fifth, and the eighth stream of Time Division traffic data may be written into the traffic data FIFO. The traffic data FIFO may be of a structure as shown in FIG. 6.

In step 204, CNs of channels bearing traffic data may be successively written into a traffic CI FIFO according to channel traffic sequence numbers.

During calculation of CI FIFO of eight streams of E1 traffic, the sequence number of Time Division traffic data being transmitted may be calculated by MODing the CI of the Time Division traffic data being transmitted with the CWN. The CWN may be increased by 1 after transmission of a stream of Time Division traffic data. Given the CWN value, the CN corresponding to the TD traffic data being transmitted may be obtained according to CIs corresponding to respective streams of TD traffic data calculated in step 101. The obtained CN value may then be written into the traffic CI FIFO.

When CWN=1, that is, when the first stream of channel traffic sequence is being transmitted, CN=1 may be obtained according to CI1=1 calculated in step 201.

When CWN=2, that is, when the second stream of channel traffic sequence is being transmitted, CN=3 may be obtained according to CI3=2 calculated in step 201.

When CWN=3, that is, when the third stream of channel traffic sequence is being transmitted, CN=4 may be obtained according to CI4=3 calculated in step 201.

When CWN=4, that is, when the fourth stream of channel traffic sequence is being transmitted, CN=5 may be obtained according to CI5=4 calculated in step 201.

When CWN=5, that is, when the fifth stream of channel traffic sequence is being transmitted, CN=8 may be obtained according to CI8=5 calculated in step 201.

The calculated CN=1, CN=3, CN=4, CN=5, and CN=8 may be written successively into the traffic CI FIFO.

In step 205, traffic data of Time Division traffic and a CN of a channel bearing the traffic data of the Time Division traffic may be read respectively from the traffic data FIFO and the traffic CI FIFO.

Figure 7:
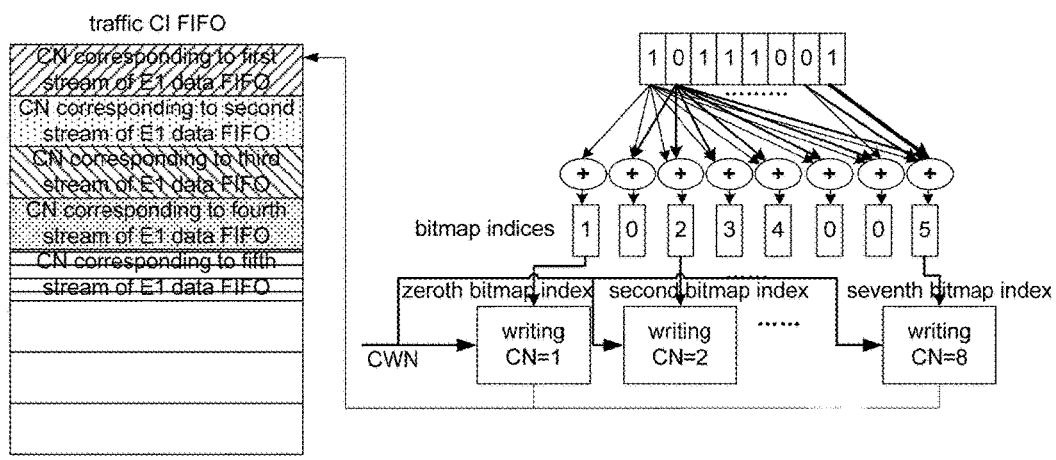
FIG. 7 is a diagram of a structure for pointer processing for receiving eight streams of E1 traffic according to an embodiment herein.

A structure for pointer processing for receiving eight streams of E1 traffic according to an embodiment herein may be as shown in FIG. 7. Steps 201-204 may implement a pointer for reading the traffic data FIFO of eight streams of E1 and a pointer for reading the traffic CI FIFO of eight streams of E1 that are completely consistent with each other, implementing synchronization between E1 traffic data and E1 traffic CNs, avoiding disorder of Time Division traffic transmission on different frames.

Figure 8:
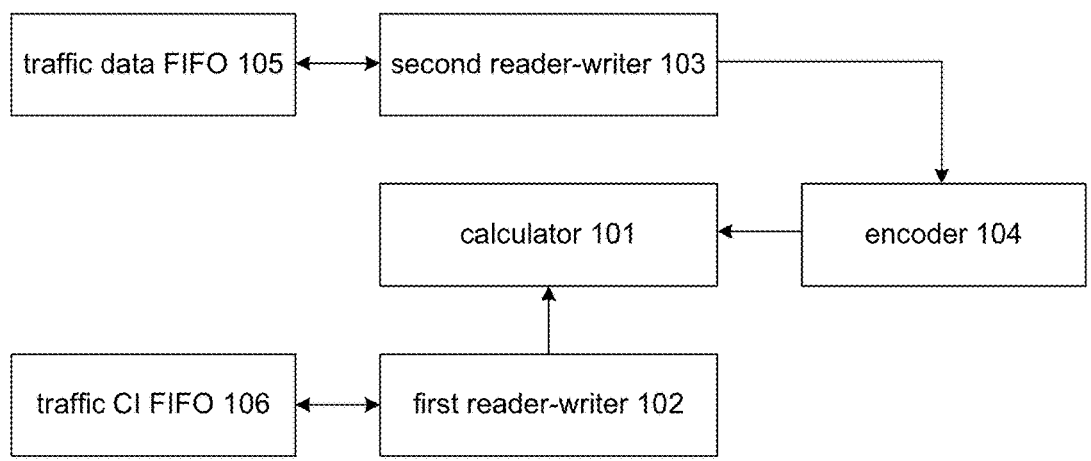
FIG. 8 is a diagram of a structure of a device for transmitting multiple streams of Time Division traffic according to an embodiment herein.

To implement an aforementioned method for transmitting multiple streams of Time Division traffic, an embodiment herein further provides a device for transmitting multiple streams of Time Division traffic. As shown in FIG. 8, the device for transmitting multiple streams of Time Division traffic includes a calculator 101, a first reader-writer 102, a second reader-writer 103, an encoder 104, a traffic data First Input First output queue (FIFO) 105, and a traffic Channel Index (CI) FIF106.

The calculator 101 is configured for: calculating a channel traffic sequence number corresponding to a stream of Time Division traffic.

The first reader-writer 102 is configured for: writing traffic data borne on a channel bearing the traffic data successively into the traffic data FIFO.

The encoder 104 is configured for: determining, according to a channel traffic sequence number corresponding to a stream of TD traffic calculated by the calculator 101, a Channel Number (CN) of the channel bearing the traffic data.

The second reader-writer 103 is configured for: writing the CN of the channel bearing the traffic data successively into the traffic CI FIFO.

The traffic data FIFO 105 is configured for: storing the traffic data borne on the channel bearing the traffic data.

The traffic CI FIFO 106 is configured for: storing the CN of the channel bearing the traffic data.

The first reader-writer 102 may be further configured for: when needed, reading traffic data of the Time Division traffic written in the traffic data FIFO.

The second reader-writer 103 may be further configured for: when needed, reading a CN of a channel bearing the traffic data of the Time Division traffic written in the traffic CI FIFO.

Note that in an actual application, functions of the calculator 101, the first reader-writer 102, the second reader-writer 103, the encoder 104, the traffic data FIFO 105, the traffic CI FIFO 10 may be implemented by a Central Processing Unit (CPU), or a Micro Processor Unit (MPU), or a Digital Signal Processor (DSP), or a memory, or a Field-Programmable Gate Array (FPGA) located in a terminal.

What described are merely embodiments of the disclosure and are not intended to limit the protection scope of the disclosure.

The invention claimed is:

1. A method for transmitting multiple streams of Time Division traffic, comprising:
    calculating a channel traffic sequence number corresponding to a stream of Time Division traffic;
    determining, according to the calculated channel traffic sequence number, a Channel Number (CN) of a channel bearing traffic data;
    successively writing the traffic data borne on the channel bearing the traffic data and the CN of the channel bearing the traffic data respectively into a traffic data First Input First output queue (FIFO) and a traffic Channel Index (CI) FIFO;
    when traffic needs to be read, reading traffic data of the Time Division traffic and a CN of a channel bearing the traffic data of the Time Division traffic respectively from the traffic data FIFO and the traffic CI FIFO,
    wherein the calculating a channel traffic sequence number corresponding to a stream of Time Division traffic comprises:
    obtaining the channel traffic sequence number corresponding to the stream of Time Division traffic by obtaining a sum over a bit corresponding to the stream of Time Division traffic and any preceding bit in a bitmap of the Time Division traffic, and then ANDing the sum with the bit corresponding to the stream of Time Division traffic,
    wherein the bitmap represents a frame structure of the Time Division traffic, and indicates the multiple streams of Time Division traffic data transmitted on a time slot, a bit width of the bitmap representing a maximal number of transmitted streams of Time Division traffic data supported by a system,
    wherein the determining, according to the calculated channel traffic sequence number, a Channel Number (CN) of a channel bearing traffic data comprises:
    filtering out, from any calculated channel traffic sequence number, any channel traffic sequence number equal to zero; determining a channel corresponding to a nonzero channel traffic sequence number to be a channel bearing traffic data; and determining the CN of the channel bearing the traffic data.

2. The method according to claim 1, wherein the successively writing the traffic data borne on the channel bearing the traffic data and the CN of the channel bearing the traffic data respectively into a traffic data First Input First output queue (FIFO) and a traffic Channel Index (CI) FIFO comprises:
    writing, successively according to a transmission order, the traffic data borne on the channel bearing the traffic data into the traffic data FIFO; and writing, successively according to the channel traffic sequence number, the CN of the channel bearing the traffic data into the traffic CI FIFO.

3. A device for transmitting multiple streams of Time Division traffic, comprising a calculator, a first reader-writer, an encoder, a second reader-writer, a traffic data First Input First output queue (FIFO), and a traffic Channel Index (CI) FIFO, wherein
    the calculator is configured for: calculating a channel traffic sequence number corresponding to a stream of Time Division traffic;
    the first reader-writer is configured for: writing traffic data borne on a channel bearing the traffic data successively into the traffic data FIFO;
    the encoder is configured for: determining, according to the channel traffic sequence number calculated by the calculator, a Channel Number (CN) of the channel bearing the traffic data;
    the second reader-writer is configured for: writing the CN of the channel bearing the traffic data successively into the traffic CI FIFO;
    the traffic data FIFO is configured for: storing the traffic data borne on the channel bearing the traffic data;
    the traffic CI FIFO is configured for: storing the CN of the channel bearing the traffic data,
    wherein the first reader-writer is further configured for: when needed, reading traffic data of the Time Division traffic written in the traffic data FIFO,
    wherein the second reader-writer is further configured for: when needed, reading a CN of a channel bearing the traffic data of the Time Division traffic written in the traffic CI FIFO,
    wherein the calculator is configured for obtaining the channel traffic sequence number corresponding to the stream of Time Division traffic by obtaining a sum over a bit corresponding to the stream of Time Division traffic and any preceding bit in a bitmap of the Time Division traffic, and then ANDing the sum with the bit corresponding to the stream of Time Division traffic,
    wherein the bitmap represents a frame structure of the Time Division traffic, and indicates the multiple streams of Time Division traffic data transmitted on a time slot, a bit width of the bitmap representing a maximal number of transmitted streams of Time Division traffic data supported by a system,
    wherein the encoder is configured for filtering out, from any calculated channel traffic sequence number, any channel traffic sequence number equal to zero; determining a channel corresponding to a nonzero channel traffic sequence number to be a channel bearing traffic data; and determining the CN of the channel bearing the traffic data.

4. The device according to claim 3, wherein the first reader-writer is configured for writing, successively according to a transmission order, the traffic data borne on the channel bearing the traffic data into the traffic data FIFO;
    the second reader-writer is configured for writing, successively according to the channel traffic sequence number, the CN of the channel bearing the traffic data into the traffic CI FIFO.

* * * * *